(12) United States Patent
Chang et al.

(10) Patent No.: US 9,627,984 B2
(45) Date of Patent: Apr. 18, 2017

(54) ISOLATED POWER SUPPLY CIRCUIT WITH PROGRAMMABLE FUNCTION AND CONTROL METHOD THEREOF

(71) Applicants: Kuang-Fu Chang, Kaohsiung (TW); Tzu-Chen Lin, Changhua (TW); Chih-Wei Chi, New Taipei (TW)

(72) Inventors: Kuang-Fu Chang, Kaohsiung (TW); Tzu-Chen Lin, Changhua (TW); Chih-Wei Chi, New Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 82 days.

(21) Appl. No.: 14/676,268

(22) Filed: Apr. 1, 2015

(65) Prior Publication Data
US 2015/0288288 A1 Oct. 8, 2015

Related U.S. Application Data

(60) Provisional application No. 61/975,296, filed on Apr. 4, 2014.

(51) Int. Cl.
*H02M 3/335* (2006.01)
*H02M 1/00* (2006.01)
(Continued)

(52) U.S. Cl.
CPC .......... *H02M 3/33523* (2013.01); *H02M 1/44* (2013.01); *H02M 3/33507* (2013.01);
(Continued)

(58) Field of Classification Search
CPC ....... H02M 2001/322; H02M 3/33523; H02M 2001/0032; H02M 3/33507; H02M 1/44;
(Continued)

(56) References Cited

U.S. PATENT DOCUMENTS 8,106,596 B2 * 1/2012 Chang ................ H05B 33/0818
315/209 R
8,111,015 B2 * 2/2012 Chang ................ H05B 33/0818
315/247
(Continued)

FOREIGN PATENT DOCUMENTS

TW M285132 1/2006
TW M385163 U1 7/2010

*Primary Examiner* — Jessica Han
*Assistant Examiner* — Demetries A Gibson
(74) *Attorney, Agent, or Firm* — Tung & Associates (57) ABSTRACT

The present invention provides an isolated power supply circuit with a programmable function and a control method thereof. The isolated power supply circuit includes: a transformer circuit, a power switch circuit, a control circuit, and a discharge circuit. The control circuit generates an operation signal and a bleeding signal according to a setting signal. The discharge circuit is coupled to an output node, for generating a discharging current. When the programmable output voltage at the output node switches between different predetermined levels, in a transition period, the bleeding signal adjusts the discharging current to discharge the output node, such that the transition period is shortened.

16 Claims, 6 Drawing Sheets

(51) Int. Cl.
 *H02M 7/527* (2006.01)
 *H02M 1/44* (2007.01)
 *H02M 1/32* (2007.01)
(52) U.S. Cl.
 CPC ...... *H02M 7/527* (2013.01); *H02M 2001/007* (2013.01); *H02M 2001/322* (2013.01)
(58) Field of Classification Search
 CPC . H02M 2001/007; H02M 7/527; Y02B 70/16; G05F 1/56; G05F 1/575; H03K 17/04123
 See application file for complete search history.

(56) References Cited

U.S. PATENT DOCUMENTS

| | | | |
|---|---|---|---|
| 8,258,824 B2 | 9/2012 | Chia | |
| 8,558,494 B2 * | 10/2013 | Tseng | H02M 3/158 318/400.01 |
| 9,190,916 B2 * | 11/2015 | Sato | H02M 3/33507 |
| 2008/0278973 A1 * | 11/2008 | Lin | H02M 3/33523 363/21.08 |
| 2011/0051463 A1 * | 3/2011 | Chen | H02M 3/33507 363/19 |
| 2013/0215651 A1 * | 8/2013 | Liao | H02M 5/40 363/34 |
| 2013/0250627 A1 * | 9/2013 | Herfurth | H02M 3/3376 363/21.15 |
| 2014/0019446 A1 * | 1/2014 | He | G06F 17/30867 707/725 |
| 2014/0139962 A1 * | 5/2014 | Voss | H04L 25/0266 361/91.6 |
| 2014/0192565 A1 * | 7/2014 | Wang | H02M 3/33592 363/21.14 |
| 2014/0192566 A1 * | 7/2014 | Yang | H02M 3/33523 363/21.15 |
| 2014/0198535 A1 * | 7/2014 | Yang | H02M 3/33523 363/16 |
| 2014/0254215 A1 * | 9/2014 | Brinlee | H02M 3/33507 363/21.15 |
| 2014/0321167 A1 * | 10/2014 | Klein | H02M 3/33507 363/16 |
| 2016/0322911 A1 * | 11/2016 | Hou | H02M 1/08 |

* cited by examiner

ISOLATED POWER SUPPLY CIRCUIT WITH PROGRAMMABLE FUNCTION AND CONTROL METHOD THEREOF

CROSS REFERENCE

The present invention claims priority to U.S. 61/975,296, filed on Apr. 4, 2014.

BACKGROUND OF THE INVENTION

Field of Invention

The present invention relates to an isolated power supply circuit with a programmable function and a control method thereof; particularly, it relates to such isolated power supply circuit and control method thereof with a relatively shorter output level transition period.

Description of Related Art

Figure 1:
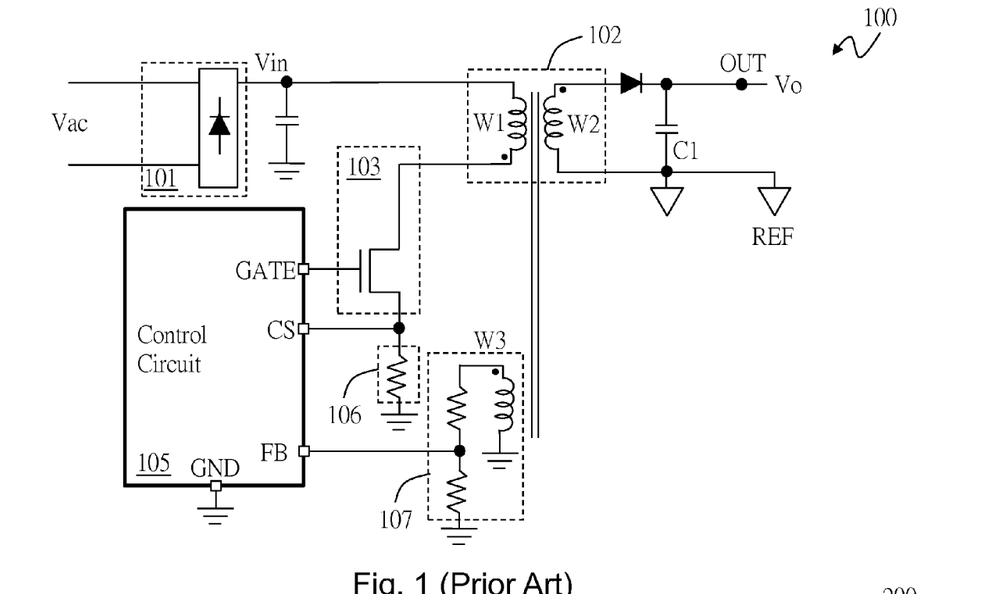
FIG. 1 shows a schematic diagram of a conventional isolated power supply circuit 100.

FIG. 1 shows a schematic diagram of a conventional isolated power supply circuit 100. As shown in FIG. 1, a rectifier circuit 101 rectifies an AC voltage Vac to generate an input voltage Vin. The rectifier circuit 101 is for example a bridge rectifier circuit. A transformer circuit 102 of the isolated power supply circuit 100 receives the input voltage Vin, and converts it to an output voltage Vo. The isolated power supply circuit 100 includes the aforementioned transformer circuit 102, a power switch circuit 103, a control circuit 105, an input current sense circuit 106, and an output voltage sense circuit 107. The control circuit 105 generates an operation signal GATE according to a current sense signal CS generated by the input current sense circuit 106 and a feedback signal FB generated by the output voltage sense circuit 107, for converting the input voltage Vin to the output voltage Vo. The transformer circuit 102 includes a primary winding W1 and a secondary winding W2. The secondary winding w2 is electrically connected to a reference level REF, and the primary winding W1 and a third winding W3 are coupled to a ground level GND. The output voltage sense circuit 107 senses the output voltage Vo by the third winding W3 to generate the feedback signal FB, wherein voltage across the third winding W3 is proportional to the voltage across the secondary winding W2, i.e., the output voltage Vo. For better logic in description, the third winding W3 is described as a part of the output voltage sense circuit 107; in circuit implementation, the third winding W3 may be included as a part of the transformer circuit 102.

The aforementioned conventional isolated power supply circuit 100 can only provide the output voltage Vo at one single predetermined level. The conventional isolated power supply circuit 100 can not provide different output voltages Vo at different levels according to different loading requirements. There is another prior art isolated power supply circuit which provides a programmable function wherein the output voltage Vo can switch between different levels, but this prior art requires a long transition period when the output voltage Vo switches from one level to another.

In view of the above, the present invention proposes an isolated power supply circuit with a programmable function and a control method thereof, whereby a transition period between different output voltage levels is shortened.

SUMMARY OF THE INVENTION

From one perspective, the present invention provides an isolated power supply circuit with a programmable function; the isolated power supply circuit with a programmable function includes: a first transformer circuit, which includes a primary winding and a secondary winding, wherein the primary winding receives an input voltage and the secondary winding generates a programmable output voltage at an output node; a power switch circuit, which is coupled to the primary winding, the power switch circuit operating according to an operation signal to convert the input voltage to the programmable output voltage; a discharge circuit, which is coupled to the output node, for generating a discharging current according to a bleeding signal; and a control circuit, which is coupled to the power switch circuit and the discharge circuit, for generating the operation signal and the bleeding signal at least according to a setting signal; wherein the control circuit adjusts the operation signal according to the setting signal, such that the programmable output voltage switches from a first predetermined level to a second predetermined level, and in a transition period when the programmable output voltage switches from the first predetermined level to the second predetermined level, the control circuit determines the bleeding signal whereby the discharge circuit adjusts the discharging current, so that the discharging current discharges the programmable output voltage.

In one preferable embodiment, the isolated power supply circuit further includes an output voltage sense circuit, which is coupled between the transformer circuit and the control circuit, for generating a feedback signal according to the programmable output voltage.

In one preferable embodiment, the output voltage sense circuit includes: a tertiary winding, which is coupled to the secondary winding, for generating a sense signal according to the programmable output voltage; and a conversion circuit, which is coupled to the tertiary winding, for converting the sense signal to the feedback signal.

In one preferable embodiment, the control circuit adjusts the setting signal according to the programmable output voltage or a signal related to the programmable output voltage, an input current or a signal related to the input current, or an output current or a signal related to the output current, wherein the programmable output voltage or the signal related to the programmable output voltage, the input current or the signal related to the input current, or the output current or the signal related to the output current includes a trigger signal which triggers the discharging current to discharge the programmable output voltage.

In one preferable embodiment, the setting signal includes a finish signal indicating to stop discharging the programmable output voltage.

In one preferable embodiment, the discharge circuit includes: an opto-coupler, which is coupled to the control circuit, for generating the discharge current according to the bleeding signal; and a voltage difference circuit, which is coupled to the opto-coupler, for providing a voltage difference in a path of the discharging current.

In one preferable embodiment, the discharge circuit includes: a second transformer circuit, which has: a discharger primary winding, which is coupled to the control circuit, for receiving the bleeding signal; and a discharger secondary winding, which is coupled to the discharger primary winding, for sensing the bleeding signal to generate a coupled signal; and a voltage difference circuit, which is coupled to the discharge secondary winding and the output node, for generating the discharging current according to the coupled signal.

In one preferable embodiment, the isolated power supply circuit further includes an input current sense circuit, which is coupled to the power switch circuit and the control circuit, for generating a current sense signal according to an input current flowing through the power switch circuit, such that the control circuit generates the operation signal further according to the current sense signal.

From another perspective, the present invention provides a control method of an isolated power supply circuit with a programmable function, wherein the isolated power supply circuit includes a first transformer circuit, which has a primary winding and a secondary winding, the control method including: receiving an input voltage by the primary winding and generating a programmable output voltage at an output node by the secondary winding; operating a power switch circuit according to an operation signal to convert the input voltage to the programmable output voltage, wherein the power switch circuit is coupled to the primary winding; adjusting the operation signal according to a setting signal, such that the programmable output voltage switches from a first predetermined level to a second predetermined level; generating a bleeding signal according to the setting signal in a transition period when the programmable output voltage switches from the first predetermined level to the second predetermined level; and generating a discharging current according to the bleeding signal, whereby the discharging current discharges the programmable output voltage in the transition period.

In one preferable embodiment, the control method further includes: generating a feedback signal according to the programmable output voltage.

In one preferable embodiment, the step of generating the feedback signal according to the programmable output voltage includes: generating a sense signal by sensing the programmable output voltage with a tertiary winding which is coupled to the secondary winding; and converting the sense signal to the feedback signal.

In one preferable embodiment, the control method further includes: adjusting the setting signal according to the programmable output voltage or a signal related to the programmable output voltage, an input current or a signal related to the input current, or an output current or a signal related to the output current, wherein the programmable output voltage or the signal related to the programmable output voltage, the input current or the signal related to the input current, or the output current or the signal related to the output current includes a trigger signal which triggers the discharging current to discharge the programmable output voltage.

In one preferable embodiment, the setting signal includes a finish signal indicating to stop discharging the programmable output voltage.

In one preferable embodiment, the step of generating the discharging current according to the bleeding signal includes: transmitting the bleeding signal through optocoupling to generate the discharging current.

In one preferable embodiment, the step of generating a discharging current according to the bleeding signal includes: receiving the bleeding signal by a discharger primary winding; sensing the bleeding signal to generate a coupled signal by a secondary winding; and generating the discharging current according to the coupled signal.

In one preferable embodiment, the control method further includes: generating a current sense signal according to an input current flowing through the power switch circuit, such that the operation signal is adjusted further according to the current sense signal.

The objectives, technical details, features, and effects of the present invention will be better understood with regard to the detailed description of the embodiments below.

DESCRIPTION OF THE PREFERRED EMBODIMENTS

Figure 2A:
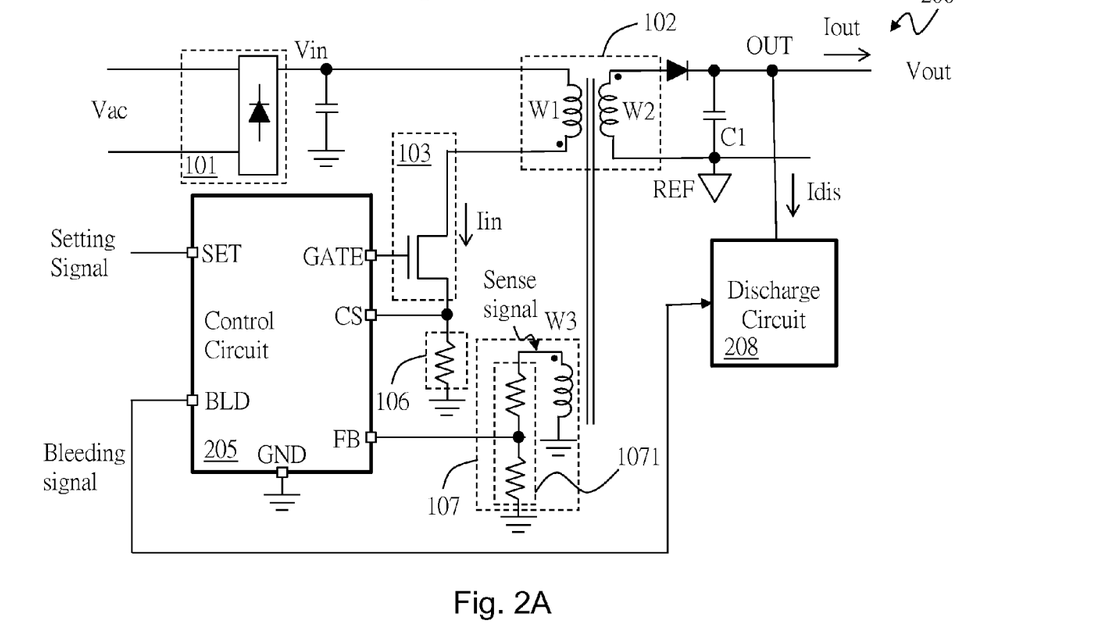
FIG. 2A shows a first embodiment of the present invention.

Please refer to FIG. 2A for a first embodiment according to the present invention. As shown in FIG. 2A, an isolated power supply circuit 200 with a programmable function includes a transformer circuit 102, a power switch circuit 103, a control circuit 205, an input current sense circuit 106, an output voltage sense circuit 107, and a discharge circuit 208. The transformer circuit 102 includes a primary winding W1 and a secondary winding W2. The rectifier circuit 101 rectifies an alternating current (AC) voltage Vac to generate an input voltage Vin. The rectifier circuit 101 is well known by those skilled in the art, so details thereof are omitted here. The primary winding W1 receives the input voltage Vin, and the secondary winding W2 generates an output voltage Vout at an output node OUT. The power switch circuit 103 is coupled to the primary winding W1, and it operates according to an operation signal GATE to convert the input voltage Vin to a programmable output voltage Vout. The control circuit 205 generates the operation signal GATE to control the power switch circuit 103, and the control circuit 205 further generates a bleeding signal BLD to control the discharge circuit 208. The operation signal GATE is generated according to a setting signal SET, in additional to the current sense signal CS and the feedback signal FB. The discharge circuit 208 is coupled to the output node OUT, and the discharge circuit 208 is controlled by the bleeding signal BLD to generate a discharging current Idis. In this invention, the output voltage Vout is programmable according to the setting signal SET. That is, the control circuit 205 adjusts the operation signal GATE according to the setting signal SET, such that the programmable output voltage Vout switches between different predetermined levels at the output node OUT, for example from a predetermined level 12V to a predetermined level 5V. In a transition period Tperiod when the programmable output voltage Vout switches from one predetermined level to another predetermined level, the control circuit 205 determines the bleeding signal BLD, whereby the discharge circuit 208 adjusts the discharging current Idis to discharge an output capacitor C1. The output capacitor C1 is coupled to the output node OUT, and the voltage across the output capacitor C1 corresponds to the programmable output voltage Vout. The input current sense circuit 106 is coupled to the power switch circuit 103 and the control circuit 205, for generating a current sense signal CS according to an input current Iin flowing through the power switch. The output voltage sense circuit 107 is coupled between the transformer circuit 102 and the control circuit 205, for generating a feedback signal FB according to the programmable output voltage Vout. The feedback signal FB is related to a level of the programmable output voltage Vout, and the feedback signal for example can be obtained from the programmable output voltage Vout, or as shown in the figure, obtained from a voltage across a tertiary winding W3 which is proportional to a voltage across the secondary winding W2, i.e., the programmable output voltage Vout. The control circuit 205 generates the operation signal GATE according to the setting signal SET, the current sense signal CS and the feedback signal FB.

According to the present invention, in the first embodiment, the output voltage sense circuit 107 for example includes the tertiary winding W3 and a conversion circuit 1071. The tertiary winding W3 is coupled to the secondary winding W2, for sensing the programmable output voltage Vout to generate a sense signal. For example, as shown in FIG. 2A, the sense signal is generated at one end of the tertiary winding W3 (which is opposite to the other end electrically connecting to the ground level GND). The conversion circuit 1071 is electrically connected to the tertiary winding W3 to receive the sense signal. The conversion circuit 1071 includes for example but not limited to two resistors connected in series, and the feedback signal FB is obtained from a divided voltage across one of the resistors.

The input current sense circuit 106 includes for example but not limited to a resistor as shown in FIG. 2A, which has one end electrically connected to the ground level GND, and the other end electrically connected to both the power switch circuit 103 and the control circuit 205. The current sense signal CS inputted to the control circuit 205 may be obtained from a voltage across the resistor of the input current sense circuit 106 where the aforementioned input current Iin flows through.

Figure 2B:
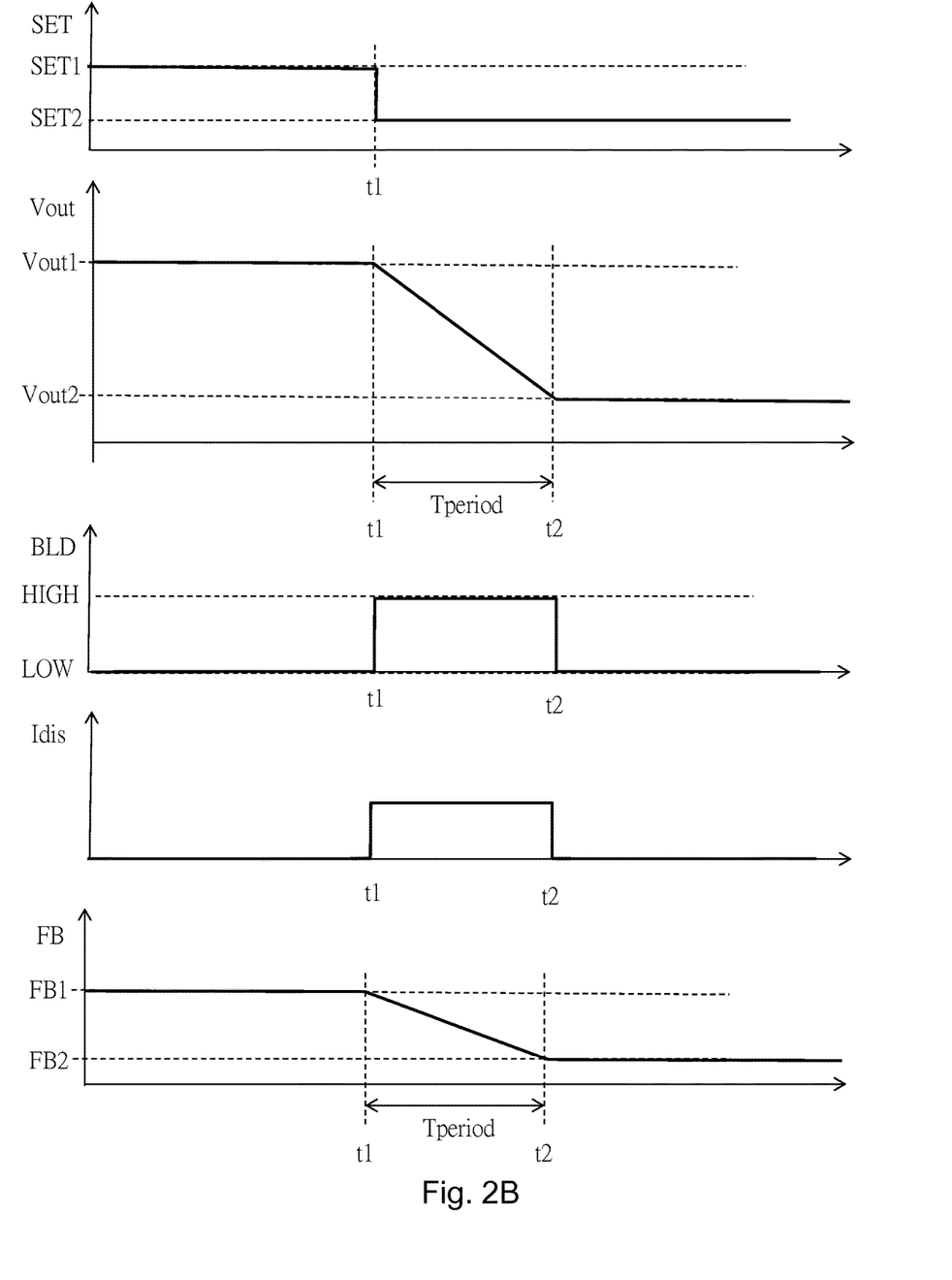
FIGS. 2B-2D show schematic diagrams of signal waveforms according to several embodiments of the present invention.

FIG. 2B shows a schematic diagram of signal waveforms according to an embodiment of the present invention. For example, the control circuit 205 may receive the setting signal SET from an external circuit, or alternatively, generate the setting signal SET internally according to the programmable output voltage Vout or its related signal, the input current Iin or its related signal, or an output current Iout or its related signal. FIG. 2B shows an example that the control circuit 205 receives the setting signal SET from an external circuit. The setting signal SET may be provided externally, for example may come from a load circuit (not shown) coupled to the output node OUT, or by a user's direct setting. FIG. 2B shows one possible signal waveform of the setting signal SET. For example, as shown in the figure, when the setting signal SET is at a level SET1 before a time point t1, the target of the programmable output voltage Vout is the predetermined level Vout1; and after the setting signal SET changes from the level SET1 to a level SET2 at time point t1, the target of the programmable output voltage Vout changes from the predetermined level Vout1 to the predetermined level Vout2. The control circuit 205 adjusts the operation signal GATE according to a change of the setting signal SET from the level SET1 to the level SET2, to control the power switch of the power switch circuit 103, such that the programmable output voltage Vout switches form the predetermined level Vout1 to the predetermined level Vout2. Because the output capacitor C1 is electrically connected between the output node OUT and the reference level REF, the output capacitor C1 needs to be discharged when the programmable output voltage Vout changes from the predetermined level Vout1 to the predetermined level Vout2. Therefore, a transition period is required to discharge the output capacitor C1 when the programmable output voltage Vout changes from the predetermined level Vout1 to the predetermined level Vout2. As shown in the figure, a transition period Tperiod is required for the programmable output voltage Vout to drop from the predetermined level Vout1 to the predetermined level Vout2, and the programmable output voltage Vout reaches the predetermined level Vout2 at a time point t2.

According to the present invention, in the first embodiment, when the setting signal SET changes from the level SET1 to the level SET2, the control circuit 205 adjusts the bleeding signal BLD according to the change of the setting signal SET. For example, the control circuit 205 adjusts the bleeding signal BLD from a low level LOW to a high level HIGH when the setting signal SET changes from the level SET1 to the level SET2, for a period of time (discharge time period). This discharge time period that the bleeding signal BLD is at the high level HIGH for example can be but is not limited to the transition period Tperiod (from the time point t1 to the time point t2); for another example, the discharge time period can be a period shorter than the transition period Tperiod. In the discharge time period, the discharge current Idis flows through the discharge circuit 208 to discharge the output capacitor C1, such that the transition period Tperiod for the programmable output voltage Vout to drop from the predetermined level Vout1 to the predetermined level Vout2 is shortened. When the programmable output voltage Vout changes from the predetermined level Vout1 to the predetermined level Vout2, the feedback signal FB also changes from a level FB1 to a level FB2.

Note that the present invention is applied to a power supply circuit having an isolated structure. That is, the circuits at the same side of the primary winding W1 of the transformer circuit 102, including the control circuit 205, the power switch circuit 103, the input current sense circuit 106, and the output voltage sense circuit 107 etc., have a relative low level which is the ground level GND; and the circuits at the same side of the secondary winding W2 of the transformer circuit 102, including the output capacitor C1 and the discharge circuit 208 etc., have a relative low level which is the reference level REF, wherein the ground level GND is isolated from the reference level REF, as well known by those skilled in the art.

Figure 3:
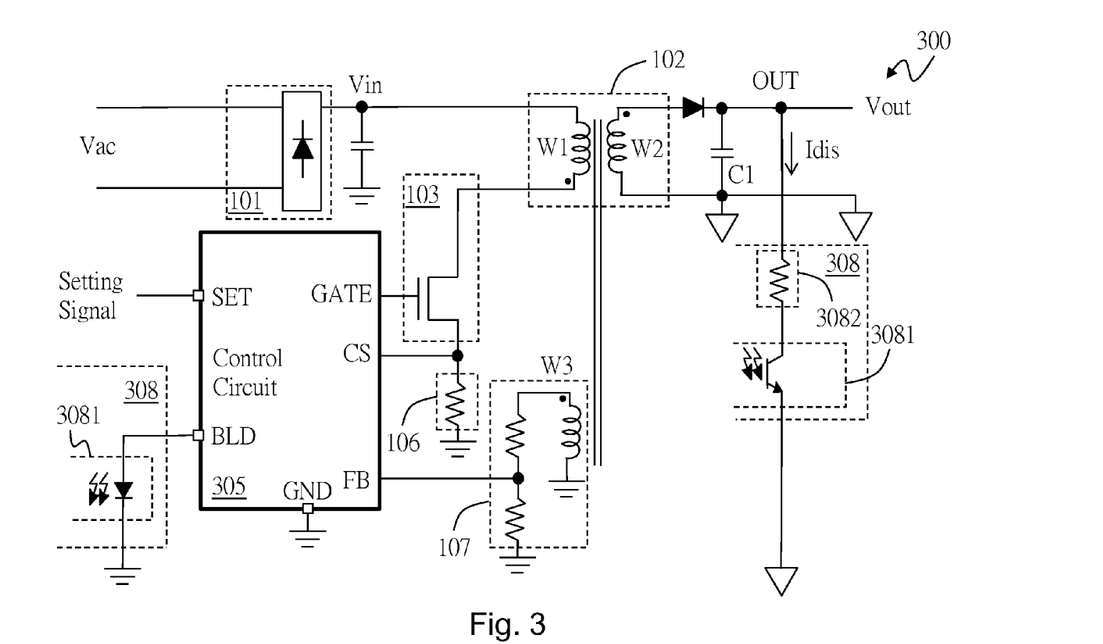
FIG. 3 shows a second embodiment of the present invention.

FIG. 3 shows a second embodiment of an isolated power supply circuit 300 with the programmable function of the present invention. This embodiment shows a more specific embodiment of a discharge circuit 308 according to the present invention. As shown in FIG. 3, in this embodiment, a control circuit 305 adjusts the operation signal GATE according to the setting signal SET, to switch the programmable output voltage Vout between different predetermined levels at the output node OUT. The control circuit 305 determines the bleeding signal BLD to adjust the discharging current Idis to discharge the output capacitor C1 when the programmable output voltage Vout switches between different predetermined levels. The discharge circuit 308 for example includes an opto-coupler 3081 and a voltage difference circuit 3082, wherein the opto-coupler 3081 is controlled by the bleeding signal BLD to generate a current between the output node OUT and the reference level REF, which is the discharging current Idis. The voltage difference circuit 3082 includes for example but not limited to a resistor as shown in the figure, which is coupled to the opto-coupler 3081 and the output node OUT, for providing a voltage drop in the current path of the discharging current Idis. The discharging current Idis discharges the output capacitor C1 so as to shorten the transition period Tperiod.

Figure 4:
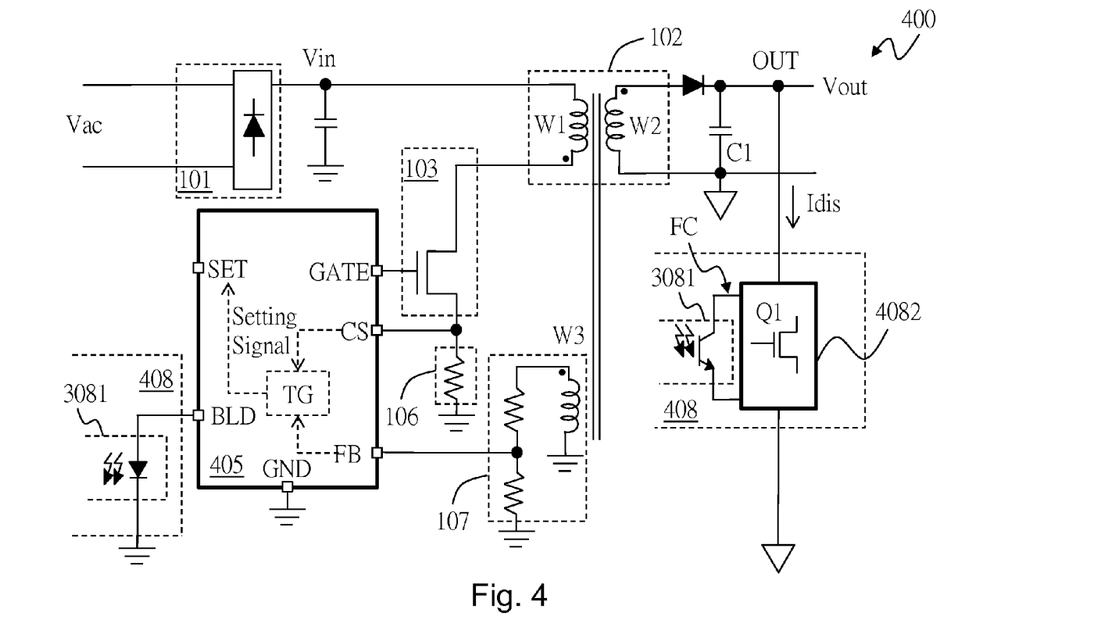
FIG. 4 shows a third embodiment of the present invention.

FIG. 4 shows a third embodiment of an isolated power supply circuit 400 with the programmable function according to the present invention. This embodiment shows a more specific embodiment of a discharge circuit 408 according to the present invention. As shown in FIG. 4, in this embodiment, the discharge circuit 408 includes the opto-coupler 3081 and a voltage difference circuit 4082, wherein the phot-coupler 3081 is coupled to a control circuit 405, for generating the discharging current Idis according to the bleeding signal BLD, and the voltage difference circuit 4082 includes for example but not limited to a transistor Q1, which is coupled to the opto-coupler 3081 and the output node OUT, for providing a voltage drop in the current path of the discharging current Idis. The transistor Q1 is for example but not limited to a metal oxide semiconductor (MOS) device or a bipolar junction transistor (BJT) device. The control circuit 405 adjusts the operation signal GATE according to the setting signal SET, to switch the programmable output voltage Vout between different predetermined levels at the output node OUT, for example from the higher predetermined level Vout1 to the lower predetermined level Vout2. The control circuit 405 determines the bleeding signal BLD, which controls the discharging current Idis to discharge the output capacitor C1 when the programmable output voltage switches between different predetermined levels in the transition period Tperiod.

Note that in this embodiment, the figure shows that, instead of providing the setting signal SET from an external circuit which is one possible embodiment, the setting signal SET may be adjusted or determined according to the programmable output voltage Vout or its related signal, the input current Iin or its related signal, or the output current Iout or its related signal, or a combination of two or more of the above.

Figure 2C:
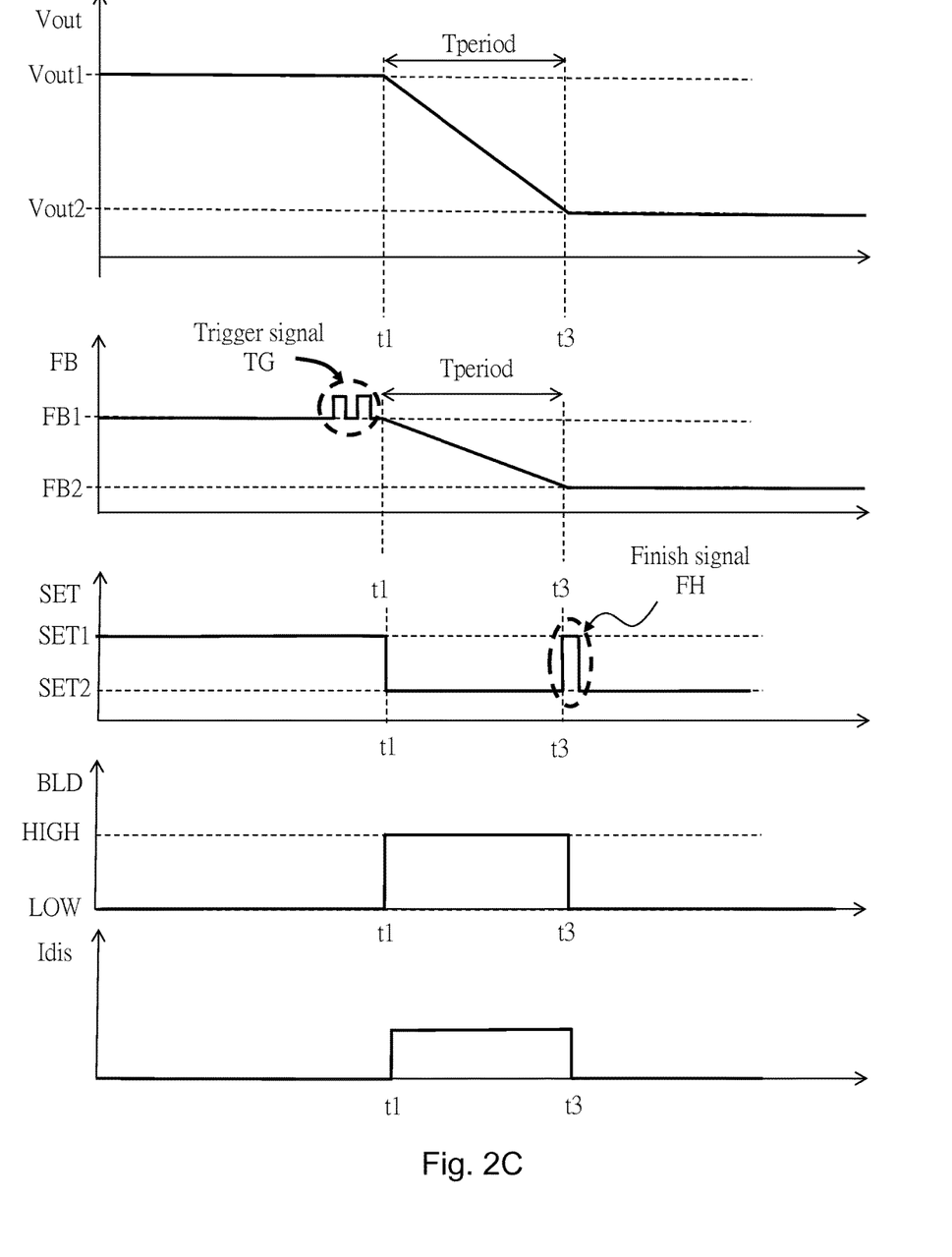

Please refer to FIG. 2C, which shows a schematic diagram of the signal waveforms of another embodiment according to the present invention. Please also refer to FIG. 4. The control circuit 405 may adjust the setting signal SET according to the programmable output voltage Vout or its related signal, the input current Iin or its related signal, or the output current Iout or its related signal, wherein the programmable output voltage Vout or its related signal, the input current Iin or its related signal, or the output current Iout or its related signal includes a trigger signal TG. (In FIG. 2C, an example is given by the feedback signal FB, which is a signal related to the programmable output voltage Vout.) The trigger signal TG triggers the discharging current Idis to start discharging the output capacitor C1. As shown in FIG. 2C, the feedback signal FB includes the trigger signal TG, wherein the trigger signal TG may be added to the feedback signal FB for example by a communication protocol. The communication protocol for example is used for the communication between the load circuit and the control circuit 405, and a code may be predefined in the communication protocol which instructs to generate the trigger signal TG. The communication protocol between the load circuit and the control circuit 405 can be defined in any way.

The trigger signal TG is inputted to the control circuit 405 before the time point t1, and the control circuit 405 changes the setting signal SET from the level SET1 to the level SET2 according to the trigger signal TG in the feedback signal FB, indicating that the target of the programmable output voltage Vout is switched to the predetermined level Vout2. Accordingly, the control circuit 405 adjusts the operation signal GATE, to control the power switch of the power switch circuit 103 such that the programmable output voltage Vout is changed from the predetermined level Vout1 to the predetermined level Vout2. As shown in the figure, a transition period Tperiod is required for the programmable output voltage Vout to drop from the predetermined level Vout1 to the predetermined level Vout2, and the programmable output voltage Vout reaches the predetermined level Vout2 at a time point t3.

According to the present invention, in this embodiment, when the setting signal SET changes from the level SET1 to the level SET2, the control circuit 405 adjusts the bleeding signal BLD according to the change of the setting signal SET. For example, when or after the setting signal SET changes from the level SET1 to the level SET2, the bleeding signal BLD is changed from a low level LOW to a high level HIGH for a period of time (discharge time period). This discharge time period for example can be but is not limited to the transition period Tperiod (from the time point t1 to the time point t3); for another example, the discharge time period can be a period shorter than the transition period Tperiod. In the discharge time period, the discharge current Idis flows through the discharge circuit 408 to discharge the output capacitor C1, such that the transition period Tperiod for the programmable output voltage Vout to switch from the predetermined level Vout1 to the predetermined level Vout2 is shortened. In the shown embodiment, the trigger signal TG is for example a square wave signal added to the feedback signal FB. However, the present invention can be embodied in other ways. For example, the trigger signal TG may be in other forms, or may be a digital or analog signal separated from the setting signal SET.

Still referring to FIG. 2C, the control circuit 405 may further adjust the setting signal SET according to the programmable output voltage Vout or its related signal, to provide a finish signal FH. For example, as shown in the figure, a single pulse signal is added to the setting signal SET at the time point t3. The finish signal FH indicates to stop discharging the output capacitor C1 by the discharging signal Idis. The finish signal FH is related to the predetermined level Vout2, and it may be generated for example as thus: when the programmable output voltage Vout decreases to the predetermined level Vout2, the feedback signal FB (which is a signal related to the programmable output voltage Vout) changes to the level FB2, and the control circuit 405 adjusts the setting signal SET according to the feedback signal FB. The setting signal SET, the trigger signal TG and the finish signal FH are not limited to the waveforms as shown in the figure, but may be in other forms such as a group of pulses, or other forms of digital or analog signals. For example, the control circuit 405 may adjust the setting signal SET to generate a single pulse at the time point t3, or to change a level of the setting signal SET at the time point t3. Or, the control circuit 405 may generate another signal separated from the setting signal SET (form another perspective, this other signal and the original setting signal SET can be regarded as one setting signal SET having two parallel parts transmitted by two parallel lines). The aforementioned adjustment of the setting signal SET indicates that the bleeding signal BLD should be adjusted, to start the discharging current according to the trigger signal TG and to decrease the discharging current preferably zero current according to the finish signal FH.

Figure 2D:
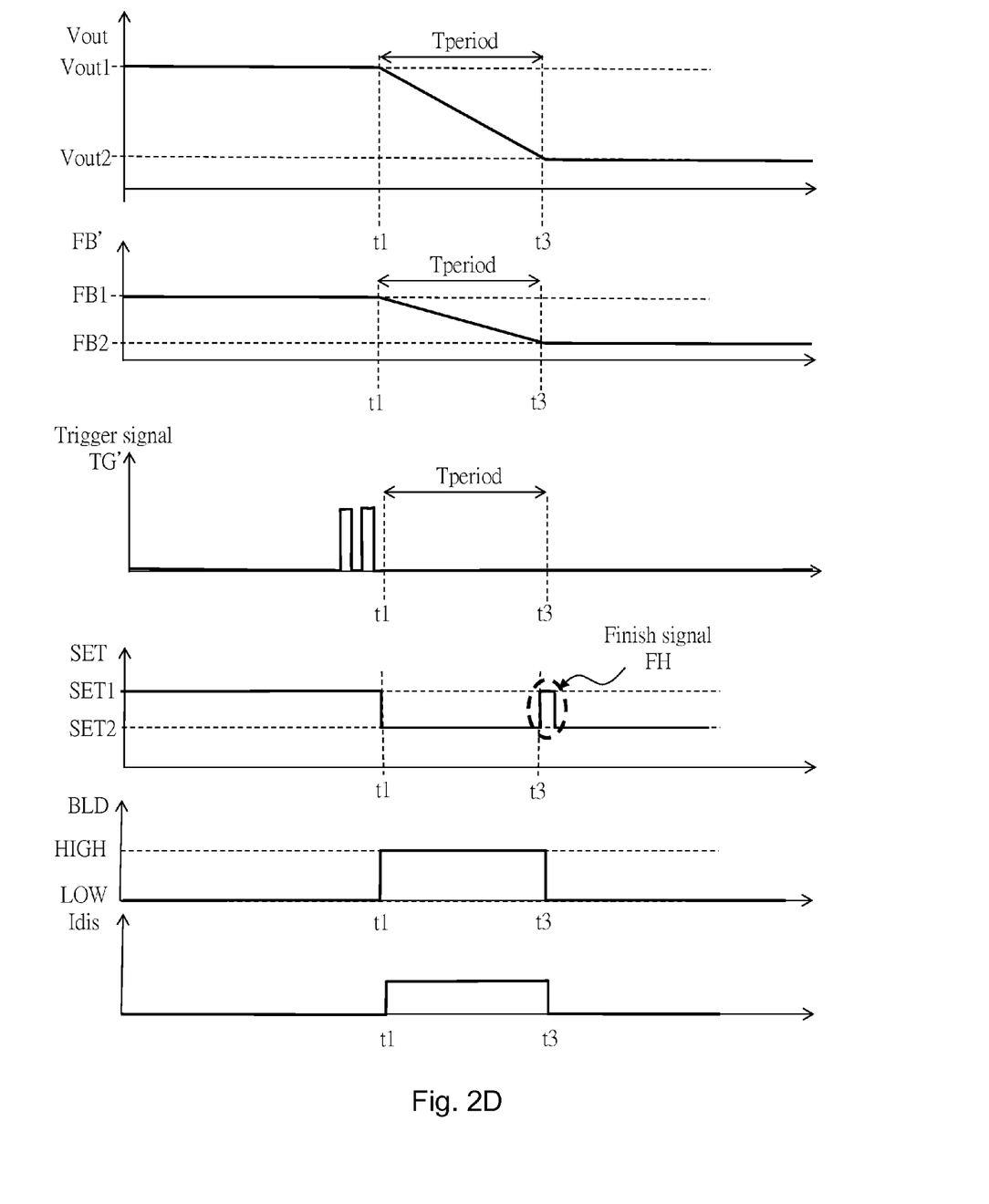

Please refer to FIG. 2D, which shows a schematic diagram of the signal waveforms of another embodiment according to the present invention. Please also refer to FIG. 4. The control circuit 405 may adjust the setting signal SET according to the programmable output voltage Vout or its related signal, the input current Iin or its related signal, or the output current Iout or its related signal, wherein the programmable output voltage Vout or its related signal, the input current Iin or its related signal, or the output current Iout or its related signal includes a trigger signal TG'. (In FIG. 2D, an example is given by the feedback signal FB, which is a signal related to the programmable output voltage Vout.) The trigger signal TG' triggers the discharging current Idis to start discharging the output capacitor C1. The setting signal SET is determined by for example but not limited to the control circuit 405 according to the feedback signal FB. As shown in FIG. 2D, the feedback signal FB includes the trigger signal TG' and a signal FB' which are two separate signals, wherein the trigger signal TG' may be generated by a communication protocol. The communication protocol for example is used for the communication between the load circuit and the control circuit 405, and a code may be predefined in the communication protocol which instructs to generate the trigger signal TG' with the signal FB'. The communication protocol between the load circuit and the control circuit 405 can be defined in any way.

The trigger signal TG' is inputted to the control circuit 405 before the time point t1, and the control circuit 405 changes the setting signal SET from the level SET1 to the level Set2 according to the trigger signal TG' in the feedback signal FB, indicating that the target of the programmable output voltage Vout is switched to the predetermined level Vout2. Accordingly, the control circuit 405 adjusts the operation signal GATE, to control the power switch of the power switch circuit 103 such that the programmable output voltage Vout is changed from the predetermined level Vout1 to the predetermined level Vout2. As shown in the figure, a transition period Tperiod is required for the programmable output voltage Vout to drop from the predetermined level Vout1 to the predetermined level Vout2, and the programmable output voltage Vout reaches the predetermined level Vout2 at a time point t3.

According to the present invention, in this embodiment, when the setting signal SET changes from the level SET1 to the level SET2, the control circuit 405 adjusts the bleeding signal BLD according to the change of the setting signal SET. For example, when or after the setting signal SET changes from the level SET1 to the level SET2, the bleeding signal BLD is changed from a low level LOW to a high level HIGH for a period of time (discharge time period). This discharge time period for example can be but is not limited to the transition period Tperiod (from the time point t1 to the time point t3); for another example, the discharge time period can be a period shorter than the transition period Tperiod. In the discharge time period, the discharge current Idis flows through the discharge circuit 408 to discharge the output capacitor C1, such that the transition period Tperiod for the programmable output voltage Vout to switch from the predetermined level Vout1 to the predetermined level Vout2 is shortened. In the shown embodiment, the trigger signal TG' and the signal FB' are two separate signals which can be regarded as one feedback signal FB having two parallel parts transmitted by two parallel lines. However, the present invention can be embodied in other ways. For example, the trigger signal TG' may be grouped with other signals, such as the programmable signal Vout or its related signal, the input current Iin or its related signal, or the output current Iout or its related signal, to be inputted to the control circuit 405.

Figure 5:
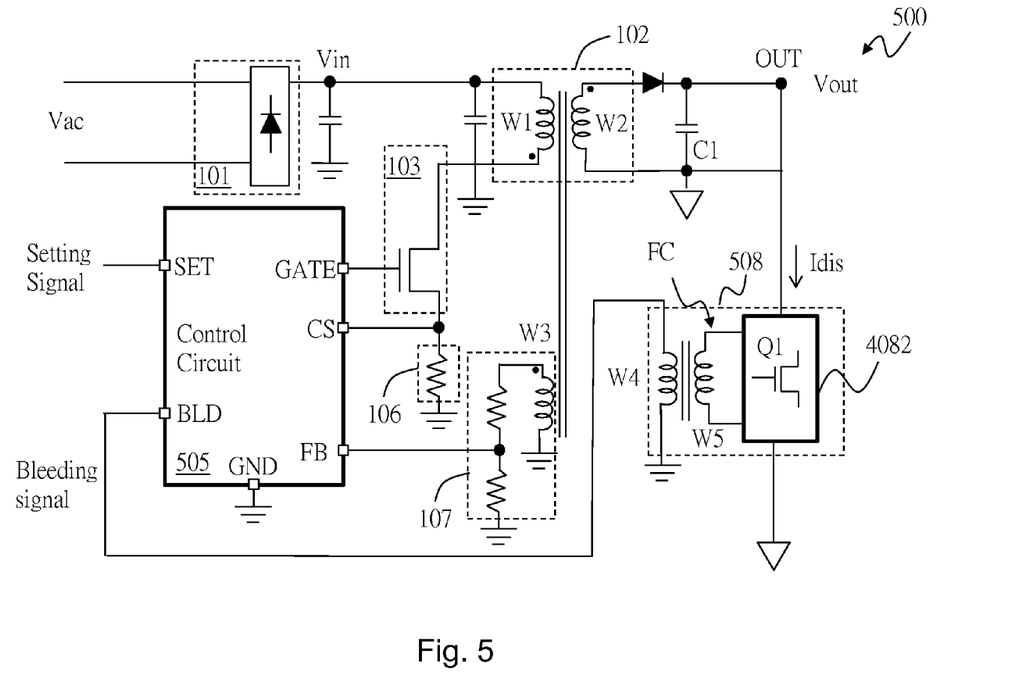
FIG. 5 shows a fourth embodiment of the present invention.

FIG. 5 shows a fourth embodiment of the present invention, which is another embodiment of the isolated power supply circuit 500 with the programmable function. This embodiment shows that the output voltage sense circuit 107 and the discharge circuit 508 may respectively include transformer circuits to generate the feedback signal FB and the discharging current Idis. As shown in FIG. 5, the discharge circuit 508 includes a transformer circuit and a voltage difference circuit 4082. The transformer circuit includes a discharger primary winding W4 and a discharger secondary winding W5. The discharger primary winding W4 is coupled to the control circuit 505, for receiving the bleeding signal BLD. The discharger secondary winding W5 is coupled to the discharger primary winding W4, and the discharger secondary winding W5 senses the bleeding signal BLD through the discharger primary winding W4 to generate a coupled signal. The voltage difference circuit 4082 for example includes a transistor Q1, and it is coupled to the discharge secondary winding W5 and the output node OUT, for generating the discharging current Idis according to the coupled signal. The voltage difference circuit 4082 for example is connected to the discharge secondary winding W5 in parallel. The control circuit 505 adjusts the operation signal GATE according to the setting signal SET, to switch the programmable output voltage Vout between different predetermined levels at the output node OUT. The control circuit 505 determines the bleeding signal BLD which controls the discharging current Idis to discharge the output capacitor C1 when the programmable output voltage Vout switches between different predetermined levels (for example, dropping from a higher level to a lower level).

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistors or the divider circuit is not limited to a circuit formed by passive devices, but it may be other circuits, such as a transistor circuit. For another example, the discharging current Idis is not limited to having a fixed level as show in the figures, but may have any waveform. For another example, the programmable output voltage Vout or its related signal, the input current Iin and its related signal, or the output current Iout or its related signal shown in the embodiments of the present invention is not limited to the feedback signal FB, but can be any other signal of the above-mentioned categories, such as the current sense signal CS, etc. For another example, the trigger signal TG is not limited to the square signal as shown in the figures, but may be a signal of any waveform. For another example, the programmable output voltage Vout is not limited to having two different predetermined levels Vout1 and Vout2, but may have three or more different predetermined levels. For another example, the setting signal is not limited to the square signal as shown in the figures, but may be a signal of any other waveform, or a signal of another form such as a digital signal, or a signal including plural sub-signals. In view of the foregoing, the spirit of the present invention should cover all such and other modifications and variations, which should be interpreted to fall within the scope of the following claims and their equivalents.

What is claimed is:

1. An isolated power supply circuit with a programmable function, comprising:
   a first transformer circuit, which includes a primary winding and a secondary winding, wherein the primary winding receives an input voltage and the secondary winding generates a programmable output voltage at an output node;

a power switch circuit, which is coupled to the primary winding, the power switch circuit operating according to an operation signal to convert the input voltage to the programmable output voltage;

a discharge circuit, which is coupled to the output node, for controlling the output node to generate a discharging current according to an output node discharging control signal; and a control circuit, which is coupled to the power switch circuit and the discharge circuit, for generating the operation signal and the output node discharging control signal at least according to a setting signal for setting a voltage level of the programmable output voltage;

wherein the control circuit adjusts the operation signal according to the setting signal, such that the programmable output voltage switches from a first predetermined level to a second predetermined level, and in a transition period when the programmable output voltage switches from the first predetermined level to the second predetermined level, the control circuit determines the output node discharging control signal whereby the discharge circuit adjusts the discharging current, so that the discharging current discharges the programmable output voltage;

wherein the discharge circuit includes:

an opto-coupler, which is coupled to the control circuit, for generating the discharge current according to the output node discharging control signal; and a voltage difference circuit, which is coupled to the opto-coupler, for providing a voltage difference in a path of the discharging current;

wherein the control circuit receives the setting signal from an external circuit, or generates the setting signal internally according to the programmable output voltage or its related signal, an input current or its related signal, or an output current or its related signal.

2. The isolated power supply circuit of claim 1, further comprising an output voltage sense circuit, which is coupled between the transformer circuit and the control circuit, for generating a feedback signal according to the programmable output voltage.

3. The isolated power supply circuit of claim 2, wherein the output voltage sense circuit includes:

a tertiary winding, which is coupled to the secondary winding, for generating a sense signal according to the programmable output voltage; and a conversion circuit, which is coupled to the tertiary winding, for converting the sense signal to the feedback signal.

4. The isolated power supply circuit of claim 3, wherein the setting signal includes a finish signal indicating to stop discharging the programmable output voltage.

5. The isolated power supply circuit of claim 1, wherein the control circuit adjusts the setting signal according to the programmable output voltage or a signal related to the programmable output voltage, an input current or a signal related to the input current, or an output current or a signal related to the output current, wherein the programmable output voltage or the signal related to the programmable output voltage, the input current or the signal related to the input current, or the output current or the signal related to the output current includes a trigger signal which triggers the discharging current to discharge the programmable output voltage.

6. The isolated power supply circuit of claim 1, further comprising an input current sense circuit, which is coupled to the power switch circuit and the control circuit, for generating a current sense signal according to an input current flowing through the power switch circuit, such that the control circuit generates the operation signal further according to the current sense signal.

7. An isolated power supply circuit with a programmable function, comprising:

a first transformer circuit, which includes a primary winding and a secondary winding, wherein the primary winding receives an input voltage and the secondary winding generates a programmable output voltage at an output node;

a power switch circuit, which is coupled to the primary winding, the power switch circuit operating according to an operation signal to convert the input voltage to the programmable output voltage;

a discharge circuit, which is coupled to the output node, for controlling the output node to generate a discharging current according to a output node discharging control signal; and a control circuit, which is coupled to the power switch circuit and the discharge circuit, for generating the operation signal and the output node discharging control signal at least according to a setting signal for setting a voltage level of the programmable output voltage;

wherein the control circuit adjusts the operation signal according to the setting signal, such that the programmable output voltage switches from a first predetermined level to a second predetermined level, and in a transition period when the programmable output voltage switches from the first predetermined level to the second predetermined level, the control circuit determines the output node discharging control signal whereby the discharge circuit adjusts the discharging current, so that the discharging current discharges the programmable output voltage;

wherein the control circuit receives the setting signal from an external circuit, or generates the setting signal internally according to the programmable output voltage or its related signal, an input current or its related signal, or an output current or its related signal;

wherein the discharge circuit includes:

a second transformer circuit, which has:

a discharger primary winding, which is coupled to the control circuit, for receiving the output node discharging control signal; and a discharger secondary winding, which is coupled to the discharger primary winding, for sensing the output node discharging control signal to generate a coupled signal; and a voltage difference circuit, which is coupled to the discharge secondary winding and the output node, for generating the discharging current according to the coupled signal.

8. The isolated power supply circuit of claim 7, further comprising an output voltage sense circuit, which is coupled between the transformer circuit and the control circuit, for generating a feedback signal according to the programmable output voltage.

9. The isolated power supply circuit of claim 8, wherein the output voltage sense circuit includes:

a tertiary winding, which is coupled to the secondary winding, for generating a sense signal according to the programmable output voltage; and a conversion circuit, which is coupled to the tertiary winding, for converting the sense signal to the feedback signal.

10. The isolated power supply circuit of claim 9, wherein the setting signal includes a finish signal indicating to stop discharging the programmable output voltage.

11. The isolated power supply circuit of claim 7, wherein the control circuit adjusts the setting signal according to the programmable output voltage or a signal related to the programmable output voltage, an input current or a signal related to the input current, or an output current or a signal related to the output current, wherein the programmable output voltage or the signal related to the programmable output voltage, the input current or the signal related to the input current, or the output current or the signal related to the output current includes a trigger signal which triggers the discharging current to discharge the programmable output voltage.

12. A control method of an isolated power supply circuit with a programmable function, wherein the isolated power supply circuit includes a first transformer circuit, which has a primary winding and a secondary winding, the control method comprising:
receiving an input voltage by the primary winding and generating a programmable output voltage at an output node by the secondary winding;
operating a power switch circuit according to an operation signal to convert the input voltage to the programmable output voltage, wherein the power switch circuit is coupled to the primary winding;
adjusting the operation signal according to a setting signal by a control circuit, such that the programmable output voltage switches from a first predetermined level to a second predetermined level, wherein the setting signal is for setting a voltage level of the programmable output voltage;
generating an output node discharging control signal according to the setting signal by the control circuit in a transition period when the programmable output voltage switches from the first predetermined level to the second predetermined level; and
controlling the output node to generate a discharging current according to the output node discharging control signal by a discharge circuit, whereby the discharging current discharges the programmable output voltage in the transition period;
wherein the step of controlling the output node to generating a discharging current according to the output node discharging control signal includes:
receiving the output node discharging control signal by a discharger primary winding;
sensing the output node discharging control signal to generate a coupled signal by a secondary winding; and
generating the discharging current according to the coupled signal;
wherein the control circuit receives the setting signal from an external circuit, or generates the setting signal internally according to the programmable output voltage or its related signal, an input current or its related signal, or an output current or its related signal.

13. The control method of claim 12, further comprising: generating a feedback signal according to the programmable output voltage by an output voltage sense circuit, which is coupled between the transformer circuit and the control circuit.

14. The control method of claim 13, wherein the step of generating the feedback signal according to the programmable output voltage includes:
generating a sense signal by sensing the programmable output voltage by a tertiary winding which is coupled to the secondary winding; and
converting the sense signal to the feedback signal by a conversion circuit.

15. The control method of claim 14, wherein the setting signal includes a finish signal indicating to stop discharging the programmable output voltage.

16. The control method of claim 12, further comprising: adjusting the setting signal according to the programmable output voltage or a signal related to the programmable output voltage, an input current or a signal related to the input current, or an output current or a signal related to the output current, wherein the programmable output voltage or the signal related to the programmable output voltage, the input current or the signal related to the input current, or the output current or the signal related to the output current includes a trigger signal which triggers the discharging current to discharge the programmable output voltage.

* * * * *